US012796733B2

(12) United States Patent
Lee et al.

(10) Patent No.: US 12,796,733 B2
(45) Date of Patent: Nov. 17, 2026

(54) AEROSOL GENERATING MODULE AND AEROSOL GENERATING DEVICE

(71) Applicant: KT&G CORPORATION, Daejeon (KR)

(72) Inventors: Wonkyeong Lee, Guri-si (KR); Min Kyu Kim, Seoul (KR); Paul Joon Sunwoo, Seoul (KR)

(73) Assignee: KT&G CORPORATION, Daejeon (KR)

( * ) Notice: Subject to any disclaimer, the term of this patent is extended or adjusted under 35 U.S.C. 154(b) by 407 days.

(21) Appl. No.: 18/569,836

(22) PCT Filed: Jun. 21, 2023

(86) PCT No.: PCT/KR2023/008567
§ 371 (c)(1),
(2) Date: Dec. 13, 2023

(87) PCT Pub. No.: WO2023/249390
PCT Pub. Date: Dec. 28, 2023

(65) Prior Publication Data
US 2024/0292886 A1 Sep. 5, 2024

(30) Foreign Application Priority Data
Jun. 23, 2022 (KR) ........................ 10-2022-0076694

(51) Int. Cl.
*A24F 40/05* (2020.01)
*A24F 40/10* (2020.01)
*A24F 40/42* (2020.01)
*A24F 40/50* (2020.01)
*B05B 17/06* (2006.01)

(52) U.S. Cl.
CPC .............. *A24F 40/05* (2020.01); *A24F 40/10* (2020.01); *A24F 40/42* (2020.01); *A24F 40/50* (2020.01); *B05B 17/0607* (2013.01)

(58) Field of Classification Search
CPC ....... A24F 40/05; A24F 40/10; B05B 17/0607
See application file for complete search history.

(56) References Cited

FOREIGN PATENT DOCUMENTS

| | | | | | |
|---|---|---|---|---|---|
| CN | 108420116 | A | * | 8/2018 | ........... A24F 47/008 |
| CN | 212937922 | U | | 4/2021 | |
| CN | 214854370 | U | | 11/2021 | |
| KR | 10-1999-0036166 | A | | 5/1999 | |
| KR | 10-2017-0132823 | A | | 12/2017 | |
| KR | 10-2018-0079298 | A | | 7/2018 | |
| KR | 10-2018-0121777 | A | | 11/2018 | |
| KR | 10-2021-0150934 | A | | 12/2021 | |
| KR | 20210150934 | A | * | 12/2021 | ............ A24F 40/10 |

(Continued)

OTHER PUBLICATIONS

English machine translation of CN-108420116-A (Year: 2018).*
(Continued)

*Primary Examiner* — Robert C Dye
(74) *Attorney, Agent, or Firm* — Sughrue Mion, PLLC

(57) ABSTRACT

An aerosol separating module includes an ultrasonic vibrator configured to generate a ultrasonic wave, a surface acoustic wave vibrator configured to generate a surface acoustic wave, and a transfer element configured to transfer an aerosol forming substrate to at least one of the ultrasonic vibrator or the surface acoustic wave vibrator.

12 Claims, 7 Drawing Sheets

(56) References Cited

FOREIGN PATENT DOCUMENTS

| | | | |
|---|---|---|---|
| WO | 2021/130220 | A1 | 7/2021 |
| WO | 2022/065679 | A1 | 3/2022 |

OTHER PUBLICATIONS

English machine translation of KR-20210150934-A (Year: 2021).*
Office Action issued Jan. 7, 2025 in Japanese Application No. 2023-577233.
International Search Report of PCT/KR2023/008567 dated Sep. 26, 2023 [PCT/ISA/210].
Written Opinion of PCT/KR2023/008567 dated Sep. 26, 2023 [PCT/ISA/237].
Extended European Search Report dated Apr. 16, 2026 in Application No. 23813538.8.

* cited by examiner

AEROSOL GENERATING MODULE AND AEROSOL GENERATING DEVICE

CROSS REFERENCE TO RELATED APPLICATIONS

This application is a National Stage of International Application No. PCT/KR2023/008567 filed on Jun. 21, 2023, claiming priority based on Korean Patent Application No. 10-2022-0076694 filed on Jun. 23, 2022, the disclosure of which is incorporated by reference herein in its entirety.

TECHNICAL FIELD

The following embodiments relate to an aerosol generating module and an aerosol generating device.

BACKGROUND ART

Recently, demands for alternative ways to overcome disadvantages of general cigarettes have increased. For example, there is an increasing demand for a device (e.g., a cigarette-type electronic cigarette) that generates an aerosol by electrically heating a cigarette stick. Accordingly, research on an electrically heated aerosol generating device and a cigarette stick (or an aerosol generating article) applied thereto is being actively conducted. For example, KR Patent Application Publication No. 10-2017-0132823 discloses a non-combustion-type flavor inhaler, a flavor inhalation component source unit, and an atomizing unit.

DISCLOSURE OF INVENTION

Technical Problem

An embodiment provides an aerosol generating module and an aerosol generating device that may assist atomization and perform preheating by using surface acoustic waves and ultrasonic waves.

An embodiment provides an aerosol generating module and an aerosol generating device that improve durability of the aerosol generating module and other internal structures by performing preheating using surface acoustic waves or ultrasonic waves prior to start of heating.

Solution to Problem

According to various embodiments, an aerosol generating module includes an ultrasonic vibrator configured to generate an ultrasonic wave, a surface acoustic wave vibrator configured to generate a surface acoustic wave, and a transfer element configured to transfer an aerosol forming substrate to at least one of the ultrasonic vibrator or the surface acoustic wave vibrator.

In an embodiment, the surface acoustic wave vibrator may be disposed to surround the ultrasonic vibrator.

In an embodiment, the transfer element may include a first surface facing at least one of the ultrasonic vibrator and the surface acoustic wave vibrator and a second surface disposed an opposite side of the first surface, wherein a portion of the first surface may be adjacent to the ultrasonic vibrator, and at least a portion of a remainder of the first surface may be adjacent to the surface acoustic wave vibrator.

In an embodiment, a temperature of the aerosol generating module may increase due to vibrations of the ultrasonic vibrator and the surface acoustic wave vibrator.

In an embodiment, the ultrasonic vibrator may include a piezoelectric body, and the surface acoustic wave vibrator may include a piezoelectric substrate and a transducer.

According to various embodiments, an aerosol generating device includes a housing, a cartridge disposed in the housing and configured to store an aerosol forming substrate, and an aerosol generating module disposed adjacent to the cartridge, wherein the aerosol generating module may include an ultrasonic wave configured to generate an ultrasonic wave, a surface acoustic wave vibrator configured to generate a surface acoustic wave, and a transfer element including the aerosol forming substrate.

In an embodiment, the transfer element may include a first surface facing the cartridge and a second surface disposed on an opposite side of the first surface and facing the aerosol generating module, wherein a portion of the second surface may be adjacent to the ultrasonic vibrator, and at least a portion of a remainder of the second surface may be adjacent to the surface acoustic wave vibrator.

In an embodiment, the surface acoustic wave vibrator may be disposed to surround the ultrasonic vibrator, a first region of the second surface of the transfer element may overlap the ultrasonic vibrator, and a second region of the second surface of the transfer element may overlap the surface acoustic wave vibrator.

In an embodiment, the ultrasonic vibrator may include a piezoelectric body, and the surface acoustic wave vibrator may include a piezoelectric substrate and a transducer.

In an embodiment, the cartridge may include a first end wall, a second end wall disposed on an opposite side of the first end wall, and an outer circumferential wall and an inner circumferential wall configured to connect the first end wall and the second end wall, wherein the first end wall, the second end wall, the outer circumferential wall, and the inner circumferential wall may form a storage space configured to store the aerosol forming substrate.

In an embodiment, the aerosol generating device may include an airflow path passing through the first end wall and the second end wall and surrounded by the inner circumferential wall, and an aerosol may move through the airflow path.

In an embodiment, the aerosol generating device may further include a controller which may control the ultrasonic vibrator and the surface acoustic wave vibrator to vibrate and control vibration frequencies of the ultrasonic vibrator and the surface acoustic wave vibrator.

In an embodiment, the controller may be configured to control the aerosol generating device to operate in one of at least two modes, wherein the at least two modes may include a first mode in which the ultrasonic vibrator and the surface acoustic wave vibrator simultaneously vibrate at different frequencies and with different vibration periods to generate an aerosol and a second mode in which one of the ultrasonic vibrator or the surface acoustic wave vibrator vibrates first to preheat the aerosol forming substrate of the transfer element and then the other of the ultrasonic vibrator or the surface acoustic wave vibrator vibrates to generate an aerosol.

Advantageous Effects of Invention

According to an embodiment, an aerosol generating module and an aerosol generating device may assist atomization and perform preheating by fusing surface acoustic waves and ultrasonic waves.

The aerosol generating module and the aerosol generating device according to an embodiment may improve durability of the aerosol generating model and other internal structures by performing preheating using surface acoustic waves or ultrasonic waves prior to start of heating.

The effects of the aerosol generating module and the aerosol generating device according to an embodiment are not limited to the above-mentioned effects, and other unmentioned effects may be clearly understood from the following description by one of ordinary skill in the art.

MODE FOR THE INVENTION

Figure 1:
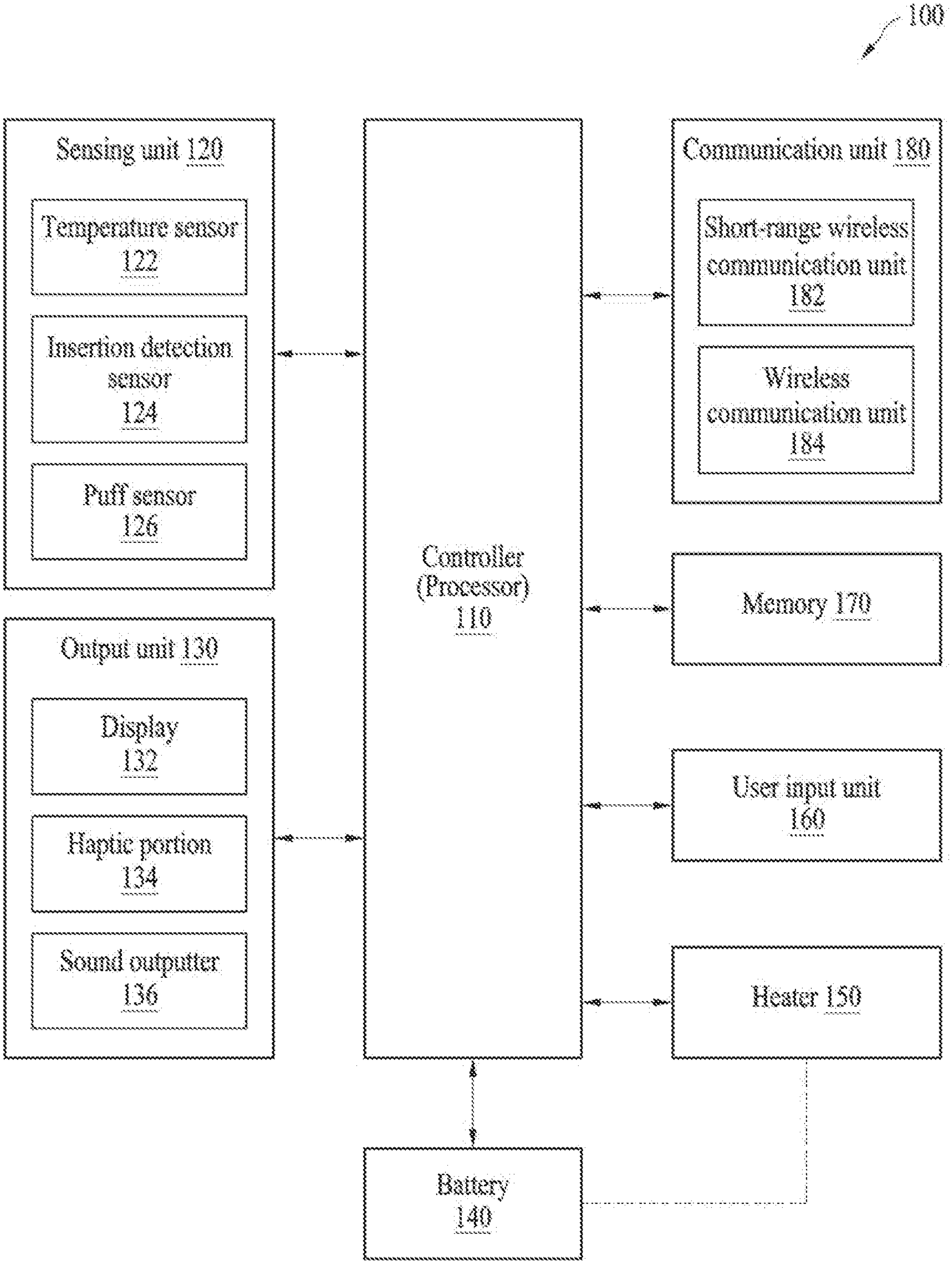
FIG. 1 is a block diagram of an aerosol generating device according to an embodiment.

The terms used to describe the embodiments are selected from among common terms that are currently widely used, in consideration of their function in the disclosure. However, different terms may be used depending on an intention of one of ordinary skill in the art, a precedent, or the advent of new technology. Also, in particular cases, the terms are arbitrarily selected by the applicant of the disclosure, and the meaning of those terms will be described in detail in the corresponding part of the detailed description. Therefore, the terms used to describe the disclosure should be defined based on the meanings of the terms and all the content of the disclosure, rather than the terms themselves.

It will be understood that when a certain part "includes" a certain component, the part does not exclude another component but may further include another component, unless the context clearly dictates otherwise. Also, terms such as "unit," "module," etc., as used in the specification may refer to a part for processing at least one function or operation and which may be implemented as hardware, software, or a combination of hardware and software.

As used herein, an expression such as "at least one of" that precedes listed components modifies not each of the listed components but all the listed components. For example, the expression "at least one of a, b, or e" should be construed as including a, b, c, a and b, a and c, b and c, or a, b, and c.

In the following embodiments, the term "aerosol generating article" may refer to an article that accommodates a medium (e.g., nicotine), such that the medium is transferred by an aerosol passing through the article. A representative example of the aerosol generating article may be a cigarette. However, the scope of the disclosure is not limited thereto.

In the following embodiments, the terms "upstream" or "upstream direction" may refer to a direction away from a mouth of a user (smoker), and the terms "downstream" or "downstream direction" may refer to a direction toward the mouth of the user. The terms "upstream" and "downstream" may be used to describe relative positions of components of the aerosol generating article.

In the following embodiments, the term "puff" refers to inhalation by a user, and inhalation refers to a situation in which a user draws in an aerosol Into his or her oral cavity, nasal cavity, or lungs through the mouth or nose.

In the following embodiments, a surface acoustic wave (SAW), which is a transverse wave, is an acoustic wave traveling along a surface of an elastic substrate. An acoustic wave may be generated from an electrical signal as a result of a piezoelectric effect.

In an embodiment, an aerosol generating device may be a device that generates an aerosol by electrically heating a cigarette accommodated in an inner space.

The aerosol generating device may include a heater. In an embodiment, the heater may be an electrically resistive beater. For example, the heater may include an electrically conductive track, and the heater may be heated as a current flows through the electrically conductive track.

The heater may include a tubular heating element, a plate-shaped heating element, a needle-shaped heating element, or a rod-shaped beating element, and may beat an interior or exterior of the cigarette according to the shape of a beating element.

The cigarette may include a tobacco rod and a filter rod. The tobacco rod may be formed as a sheet or a strand, or may be formed of tobacco leaves finely cut from a tobacco sheet. In addition, the tobacco rod may be enveloped by a thermally conductive material. For example, the thermally conductive material may be metal foil such as aluminum foil. However, embodiments are not limited thereto.

The filter rod may be a cellulose acetate filter. The filter rod may include at least one segment. For example, the filter rod may include a first segment that cools an aerosol and a second segment that filters a predetermined ingredient contained in the aerosol.

In another embodiment, the aerosol generating device may be a device that generates an aerosol using a cartridge containing an aerosol generating material.

The aerosol generating device may include a cartridge containing the aerosol generating material and a main body supporting the cartridge. The cartridge may be detachably coupled to the main body. However, embodiments are not limited thereto. The cartridge may be integrally formed or assembled with the main body, and may be secured to the main body so as not to be detached by a user. The cartridge may be mounted on the main body while the aerosol generating material is accommodated therein. However, embodiments are not limited thereto. The aerosol generating material may be injected into the cartridge while the cartridge is coupled to the main body.

The cartridge may hold the aerosol generating material in any one of various states, such as a liquid state, a solid state, a gaseous state, and a gel state. The aerosol generating material may include a liquid composition. For example, the liquid composition may be a liquid including a tobacco-containing material having a volatile tobacco flavor ingredient, or a liquid including a non-tobacco material.

The cartridge may be operated by an electrical signal or a wireless signal transmitted from the main body to perform the function of generating an aerosol by converting a phase of the aerosol generating material inside the cartridge to a gaseous phase. The aerosol may refer to a gas in which vaporized particles generated from the aerosol generating material are mixed with air.

In another embodiment, the aerosol generating device may generate an aerosol by heating the liquid composition, and the generated aerosol may pass through the cigarette and be delivered to the user. That is, the aerosol generated from the liquid composition may travel along an airflow path of the aerosol generating device, and the airflow path may be configured to allow the aerosol to pass through the cigarette and be delivered to the user.

In another embodiment, the aerosol generating device may be a device that generates an aerosol from the aerosol generating material using an ultrasonic vibration manner. In this case, the ultrasonic vibration manner may refer to a manner of generating an aerosol by atomizing the aerosol generating material with ultrasonic vibration generated by a vibrator.

The aerosol generating device may include a vibrator, and may generate vibration at short intervals through the vibrator to atomize the aerosol generating material. The vibration generated by the vibrator may be ultrasonic vibration, and a frequency band of the ultrasonic vibration may be from about 100 kilohertz (kHz) to about 3.5 megahertz (MHz). However, embodiments are not limited thereto.

The aerosol generating device may further include a transfer element that absorbs the aerosol generating material. For example, the transfer element may be disposed to surround at least one region of the vibrator or may be disposed to contact at least one region of the vibrator.

As a voltage (e.g., an alternating voltage) is applied to the vibrator, the vibrator may generate heat and/or ultrasonic vibration, and the heat and/or ultrasonic vibration generated by the vibrator may be transmitted to the aerosol generating material absorbed by the transfer element. The aerosol generating material absorbed by the transfer element may be converted into a gaseous phase by the heat and/or ultrasonic vibration transmitted from the vibrator, and consequently, an aerosol may be generated.

For example, the viscosity of the aerosol generating material absorbed by the transfer element may be lowered by the heat generated by the vibrator, and the aerosol generating material whose viscosity is lowered may change to fine particles by the ultrasonic vibration generated by the vibrator, so that an aerosol may be generated. However, embodiments are not limited thereto.

In another embodiment, the aerosol generating device may be a device that generates an aerosol by heating the aerosol generating article accommodated therein in an induction heating manner.

The aerosol generating device may include a susceptor and a coil. In an embodiment, the coil may apply a magnetic field to the susceptor. As the aerosol generating device supplies power to the coil, a magnetic field may be formed inside the coil. In an embodiment, the susceptor may be a magnetic body that generates heat by an external magnetic field. As the susceptor is positioned inside the coil and generates heat with the magnetic field applied, the aerosol generating article may be heated. Also, optionally, the susceptor may be positioned in the aerosol generating article.

In another embodiment, the aerosol generating device may further include a cradle.

The aerosol generating device and the separate cradle may form a system together. For example, the cradle may be used to charge a battery of the aerosol generating device. Alternatively, a heater may be heated when the cradle and the aerosol generating device are coupled to each other.

Hereinafter, embodiments of the disclosure will be described in detail with reference to the accompanying drawings such that one of ordinary skill in the art may easily practice the disclosure. The disclosure may be practiced in forms that are implementable in the aerosol generating devices according to various embodiments described above or may be embodied and practiced in many different forms and is not limited to the embodiments described herein.

Hereinafter, embodiments of the disclosure will be described in detail with reference to the drawings.

FIG. 1 is a block diagram of an aerosol generating device 100 according to an embodiment.

The aerosol generating device 100 may include a controller 110, a sensing unit 120, an output unit 130, a battery 140, a heater 150, a user input unit 160, a memory 170, and a communication unit 180. However, an internal structure of the aerosol generating device 100 is not limited to what is shown in FIG. 1. It is to be understood by one of ordinary skill in the art to which the disclosure pertains that some of the components shown in FIG. 1 may be omitted or new components may be added according to the design of the aerosol generating device 100.

The sensing unit 120 may sense a state of the aerosol generating device 100 or a state of an environment around the aerosol generating device 100, and transmit sensing information obtained through the sensing to the controller 110. Based on the sensing information, the controller 110 may control the aerosol generating device 100 to control operations of the heater 150, restrict smoking, determine whether an aerosol generating article (e.g., an aerosol generating article, a cartridge, etc.) is inserted, display a notification, and perform other functions.

The sensing unit 120 may include at least one of a temperature sensor 122, an insertion detection sensor 124, or a puff sensor 126. However, embodiments are not limited thereto.

The temperature sensor 122 may sense a temperature at which the heater 130 for an aerosol generating material) is heated. The aerosol generating device 100 may include a separate temperature sensor for sensing the temperature of the heater 150, or the heater 150 itself may also function as a temperature sensor. Alternatively, the temperature sensor 122 may be arranged around the battery 140 to monitor the temperature of the battery 140.

The insertion detection sensor 124 may sense whether the aerosol generating article is inserted and/or removed. The insertion detection sensor 124 may include, for example, at least one of a film sensor, a pressure sensor, a light sensor, a resistive sensor, a capacitive sensor, an inductive sensor, or an infrared sensor, which may sense a signal change by the insertion and/or removal of the aerosol generating article.

The puff sensor 126 may sense a puff from a user based on various physical changes in an airflow path or airflow channel. For example, the puff sensor 126 may sense the puff from the user based on any one of a temperature change, a flow change, a voltage change, and a pressure change.

The sensing unit 120 may further include at least one of a temperature/humidity sensor, an atmospheric pressure sensor, a magnetic sensor, an acceleration sensor, a gyroscope sensor, a position sensor (e.g., a global positioning system (GPS), a proximity sensor, or a red, green, blue (RGB) sensor (e.g., an illuminance sensor), in addition to the sensors 122 to 126 described above. A function of each sensor may be intuitively inferable from its name by one of ordinary skill in the art, and thus, a more detailed description thereof will be omitted here.

The output unit 130 may output information about the state of the aerosol generating device 100 and provide the information to the user. The output unit 130 may include at least one of a display 132, a haptic portion 134, or a sound outputter 136. However, embodiments are not limited thereto. When the display 132 and a touchpad are provided in a layered structure to form a touchscreen, the display 132 may be used as an input device in addition to an output device.

The display 132 may visually provide information about the aerosol generating device 100 to the user. The information about the aerosol generating device 100 may include, for example, a charging/discharging state of the battery 140 of the aerosol generating device 100, a preheating state of the heater 150, an insertion/removal state of the aerosol generating article, a limited usage state (e.g., an abnormal article detected) of the aerosol generating device 100, or the like, and the display 132 may externally output the information. The display 132 may be, for example, a liquid-crystal display panel (LCD), an organic light-emitting display panel (OLED), or the like. The display 132 may also be in the form of a light-emitting diode (LED) device.

The haptic portion 134 may provide information about the aerosol generating device 100 to the user in a haptic way by converting an electrical signal into a mechanical stimulus or an electrical stimulus. The haptic portion 134 may include, for example, a motor, a piezoelectric element, or an electrical stimulation device.

The sound outputter 136 may provide information about the aerosol generating device 100 to the user in an auditory way. For example, the sound outputter 136 may convert an electric signal into a sound signal and externally output the sound signal.

The battery 140 may supply power to be used to operate the aerosol generating device 100. The battery 140 may supply power to heat the heater 150. In addition, the battery 140 may supply power required for operations of the other components (e.g., the sensing unit 120, the output unit 130, the user input unit 160, the memory 170, and the communication unit 180) included in the aerosol generating device 100. The battery 140 may be a rechargeable battery or a disposable battery. The battery 140 may be, for example, a lithium polymer (LiPoly) battery. However, embodiments are not limited thereto.

The heater 150 may receive power from the battery 140 to heat the aerosol generating material. Although not shown in FIG. 1, the aerosol generating device 100 may further include a power conversion circuit (e.g., a direct current (DC)-to-DC (DC/DC) converter) that converts power of the battery 140 and supplies the power to the heater 150. In addition, when the aerosol generating device 100 generates an aerosol by induction heating, the aerosol generating device 100 may further include a DC-to-alternating current (AC) (DC/AC) converter that converts DC power of the battery 140 into AC power.

The controller 110, the sensing unit 120, the output unit 130, the user input unit 160, the memory 170, and the communication unit 180 may receive power from the battery 140 to perform functions. Although not shown in FIG. 1, the aerosol generating device 100 may further include a power conversion circuit, for example, a low dropout (LDO) circuit or a voltage regulator circuit, which converts power of the battery 140 and supplies the power to respective components.

In an embodiment, the heater 150 may be formed of a predetermined electrically resistive material that is suitable. For example, the electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, embodiments are not limited thereto. In addition, the heater 150 may be implemented as a metal heating wire, a metal heating plate on which an electrically conductive track is arranged, a ceramic heating element, or the like, but is not limited thereto.

In another embodiment, the heater 150 may be an induction heater. For example, the heater 150 may include a susceptor that heats the aerosol generating material by generating heat through a magnetic field applied by a coil.

In an embodiment, the heater 150 may include a plurality of heaters. For example, the heater 150 may include a first heater for heating the aerosol generating article and a second heater for heating a liquid.

The user input unit 160 may receive information input from the user or may output information to the user. For example, the user input unit 160 may include a keypad, a dome switch, a touchpad (e.g., a contact capacitive type, a pressure resistive film type, an infrared sensing type, a surface ultrasonic conduction type, an integral tension measurement type, a piezo effect method, etc.), a jog wheel a jog switch, or the like. However, embodiments are not limited thereto. In addition, although not shown in FIG. 1, the aerosol generating device 100 may further include a connection interface such as a universal serial bus (USB) interface, and may be connected to another external device through the connection interface such as a USB interface to transmit and receive information or to charge the battery 140.

The memory 170, which is hardware for storing various pieces of data processed in the aerosol generating device 100, may store data processed by the controller 110 and data to be processed by the controller 110. The memory 170 may include at least one type of storage medium of a flash memory type memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The memory 170 may store an operating time of the aerosol generating device 100, a maximum number of puffs, a current number of puffs, at least one temperature profile, data associated with a smoking pattern of the user, or the like.

The communication unit 180 may include at least one component for communicating with another electronic device. For example, the communication unit 180 may include a short-range wireless communication unit 182 and a wireless communication unit 184.

The short-range wireless communication unit 182 may include a Bluetooth communication unit, a Bluetooth low energy (BLE) communication unit, a near field communication unit, a wireless area network (WLAN) (wireless fidelity (Wi-Fi) communication unit a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communicator 184 may include, for example, a cellular network communication unit, an Internet communication unit, a computer network (e.g., a local area network (LAN) or a wide-area network (WAN) communication unit or the like. However, embodiments are not limited thereto. The wireless communication unit 184 may use subscriber information (e.g., international mobile subscriber identity (IMSI)) to identify and authenticate the aerosol generating device 100 in a communication network.

The controller 110 may control the overall operation of the aerosol generating device 100. In an embodiment, the controller 110 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the processor may be implemented in other types of hardware.

The controller 110 may control the temperature of the heater 150 by controlling supply of power from the battery 140 to the heater 150. For example, the controller 110 may control the supply of power by controlling switching of a switching element between the battery 140 and the heater 150. As another example, a direct heating circuit may control the supply of power to the heater 150 according to a control command from the controller 110.

The controller 110 may analyze a sensing result obtained by the sensing of the sensing unit 120 and control processes to be performed thereafter. For example, the controller 110 may control power to be supplied to the heater 150 to start or end an operation of the heater 150 based on the sensing result obtained by the sensing unit 120. As another example, the controller 110 may control an amount of power to be supplied to the heater 150 and a time for which the power is to be supplied, such that the heater 150 may be heated up to a predetermined temperature or maintained at a desired temperature, based on the sensing result obtained by the sensing unit 120.

The controller 110 may control the output unit 130 based on the sensing result obtained by the sensing unit 120. For example, when the number of puffs counted through the puff sensor 126 reaches a preset number, the controller 110 may inform the user that the aerosol generating device 100 is to be ended soon, through at least one of the display 132, the haptic portion 134, or the sound outputter 136.

In an embodiment, the controller 110 may control a power supply time and/or a power supply amount for the heater 150 according to a state of the aerosol generating article sensed by the sensing unit 120. For example, when the aerosol generating article is in an over-humidified state, the controller 110 may control the power supply time for an inductive coil to increase a preheating time, compared to a case where the aerosol generating article is in a general state.

An embodiment may also be implemented in the form of a recording medium including instructions executable by a computer, such as a program module executable by the computer. A computer-readable medium may be any available medium that may be accessed by a computer and includes a volatile medium, a non-volatile medium, a removable medium, and a non-removable medium. In addition, the computer-readable medium may include both a computer storage medium and a communication medium. The computer storage medium includes all of a volatile medium, a non-volatile medium, a removable medium, and a non-removable medium implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer medium.

Figure 2A:
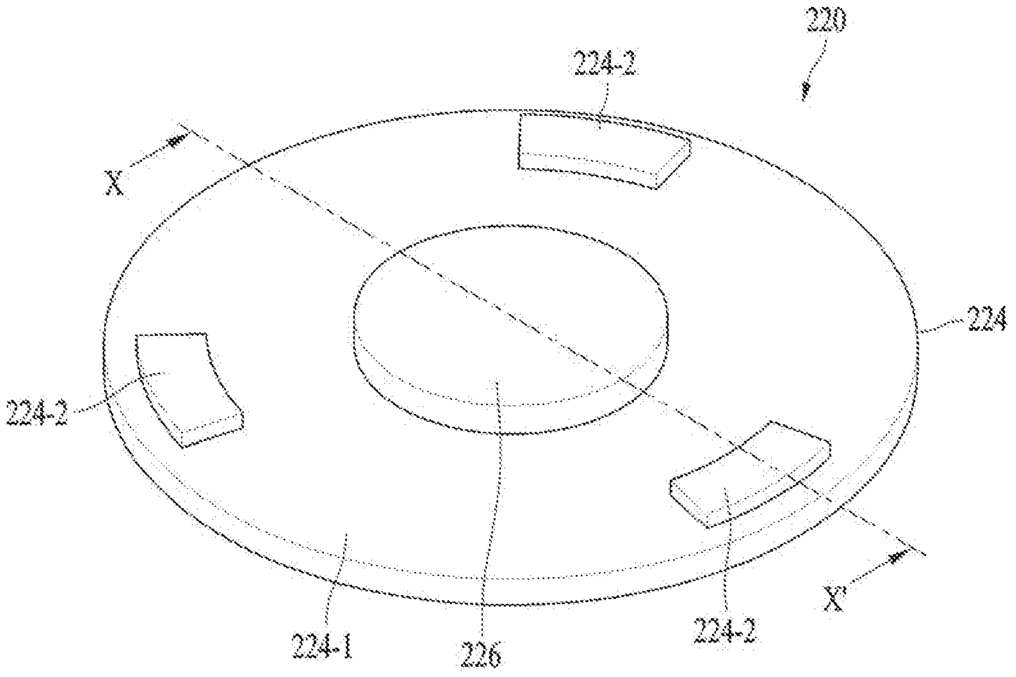
FIG. 2*a* is a schematic diagram of an aerosol generating module according to an embodiment.
Figure 2B:
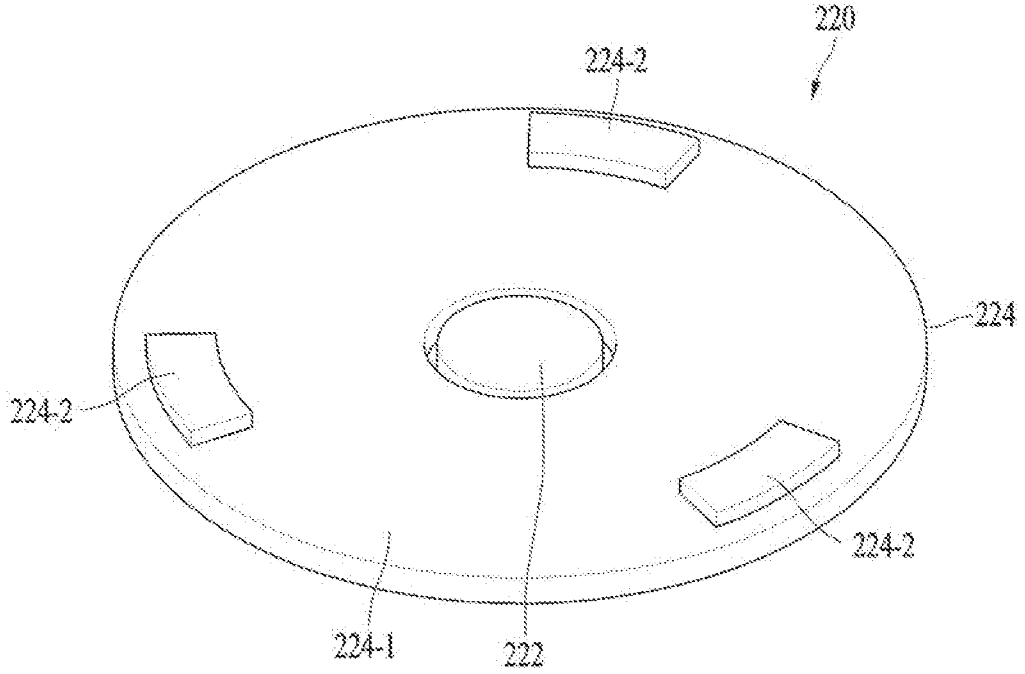
FIG. 2*b* is a schematic diagram of an aerosol generating module except for a transfer clement according to an embodiment.

FIG. 2*a* is a schematic diagram of an aerosol generating module 220 according to an embodiment. FIG. 2*b* is a schematic diagram of the aerosol generating module 220 except for a transfer element 226 according to an embodiment, In an embodiment, the aerosol generating module 220 may include an ultrasonic vibrator 222, a surface acoustic wave vibrator 224, and the transfer element 226. The ultrasonic vibrator 222 according to an embodiment may generate an aerosol by atomizing an aerosol forming substrate placed on the ultrasonic vibrator 222 through micro-vibration. The surface acoustic wave vibrator 224 according to an embodiment may generate an aerosol by atomizing an aerosol forming substrate placed on the surface acoustic wave vibrator 224 through a surface acoustic wave. The transfer clement 226 according to an embodiment may transfer the aerosol forming substrate from a cartridge or a liquid storage to the ultrasonic vibrator 222 and/or the surface acoustic wave vibrator 224 that generates an aerosol. Hereinafter, the aerosol generating module 220 including both the ultrasonic vibrator 222 and the surface acoustic wave vibrator 224, and the aerosol generating device 200 including the aerosol generating module 220 according to an embodiment are described in detail.

Referring to FIGS. 2*a* and 2*b*, the surface acoustic wave vibrator 224 and the ultrasonic vibrator 222 according to an embodiment may be disposed on a same plane. Desirably, the surface acoustic wave vibrator 224 may be formed to surround an outer circumferential surface of the ultrasonic vibrator 222. The surface acoustic wave vibrator 224 and the ultrasonic vibrator 222 may be disposed adjacent to at least one surface of the transfer element 226 to receive the aerosol forming substrate. The aerosol forming substrate according to an embodiment may be provided in a liquid, gaseous, or solid phase, and desirably, may be provided in the liquid phase.

Figure 4:
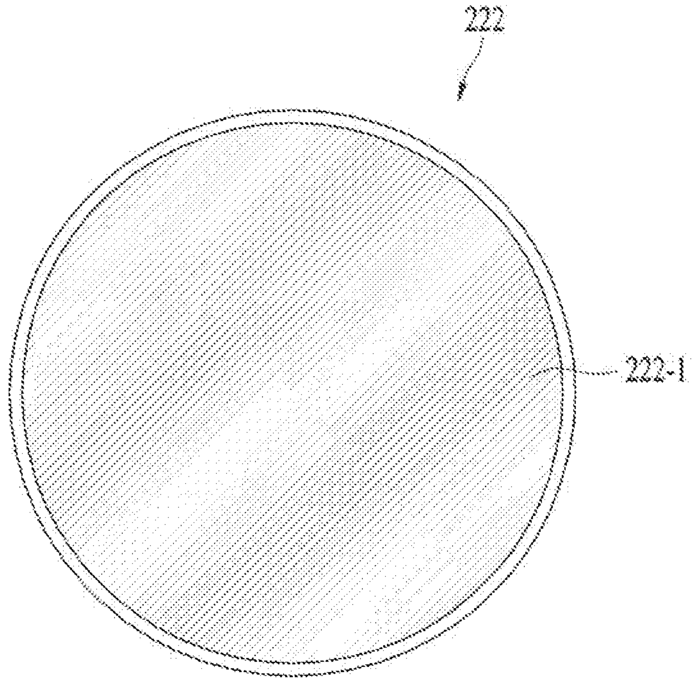
FIG. 4 is a plan view of an ultrasonic vibrator of an aerosol generating module according to an embodiment.

The ultrasonic vibrator 222 according to an embodiment may include a piezoelectric body 222-1 (see FIG. 4). The surface acoustic wave vibrator 224 according to an embodiment may include a piezoelectric substrate 224-1 and a transducer 224-2. The piezoelectric substrate 224-1 may form a surface to which a surface acoustic wave generated by the transducer 224-2 is transferred. The transducer 224-2 according to an embodiment may include an interdigital transducer. The transducer 224-2 may or may not have a polarity. The transducer 224-2 may include a piezoelectric material having a polarity and a piezoelectric material not having a polarity.

Figure 3:
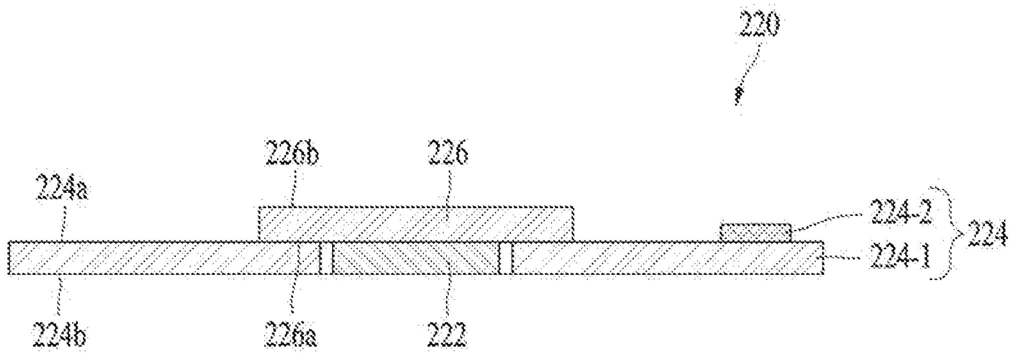
FIG. 3 is a cross-sectional view of an aerosol generating module taken along line X-X' of FIG. 1 according to an embodiment.

FIG. 3 is a cross-sectional view of the aerosol generating module 220 taken along line X-X' of FIG. 1 according to an embodiment. Referring to FIG. 3, the transfer clement 226 included in the aerosol generating module 220 according to an embodiment may include a first surface 226*a* facing or disposed adjacent to the ultrasonic vibrator 222 and/or the surface acoustic wave vibrator 224, and a second surface 226*b* disposed on an opposite side of the first surface 226*a*. The first surface 226*a* of the transfer element 226 according to an embodiment may be disposed to face the ultrasonic vibrator 222 and/or the surface acoustic wave vibrator 224. Desirably, a partial region of the first surface 226*a* may be adjacent to the ultrasonic vibrator 222, and at least a portion of a remainder of the first surface 226*a* may be adjacent to the surface acoustic wave vibrator 224. When the first surface 226*a* of the transfer element 226 according to an embodiment is disposed adjacent to both the ultrasonic vibrator 222 and the surface acoustic wave vibrator 224 at the same time, efficiency in aerosol generation may be improved by an interaction between the ultrasonic vibrator 222 and the surface acoustic wave vibrator 224. In the aerosol generating module 220 according to an embodiment, frictional heat may be generated in a process of generating an aerosol by a vibration of at least one of the ultrasonic vibrator 222 and the surface acoustic wave vibrator 224, and some electrical energy may be converted into thermal energy in a process of converting electrical energy into mechanical energy through the piezoelectric body 222-1 and/or the piezoelectric substrate 224-1. The converted thermal energy may beat the aerosol forming substrate. As the temperature of the aerosol forming substrate increases, the viscosity of the aerosol forming substrate decreases, and accordingly, an aerosol may be more smoothly generated by the ultrasonic vibrator 222 and the surface acoustic vibrator 224.

Hereinafter, referring to FIGS. 4 to 6, the structures of the ultrasonic vibrator 222, the surface acoustic wave vibrator 224, and the transfer element 226 constituting the aerosol generating module 220 are described in detail.

FIG. 4 is a plan view of the ultrasonic vibrator 222 of the aerosol generating module 220 according to an embodiment. The ultrasonic vibrator 222 according to an embodiment may include the piezoelectric body 222-1. The piezoelectric body 222-1 according to an embodiment may be a conversion element that may convert electrical energy into mechanical energy and may generate an ultrasonic wave under the control of a controller (e.g., the controller 110 of FIG. 1). In an embodiment, when alternating current power is applied to the piezoelectric body 222-1 after poling treatment, the piezoelectric body 222-1 may repeatedly expand and contract. In an embodiment, as the piezoelectric body repeatedly expands and contracts, the ultrasonic vibrator 222 may vibrate at a characteristic frequency. In an embodiment, the ultrasonic vibrator 222 may further include a diaphragm (not shown) disposed in contact with the piezoelectric body 222-1. The diaphragm in contact with the piezoelectric body 222-1 may vibrate at the characteristic frequency together with the piezoelectric body 222-1 due to the expansion and contraction of the piezoelectric body 222-1. One of ordinary skill in the art may obviously understand the principle of a piezoelectric vibration element, so any detailed description related thereto is omitted.

An ultrasonic vibrator according to another embodiment may include a piezoelectric transducer and a mesh plate. The piezoelectric transducer according to another embodiment may be a conversion element that may convert electrical energy into mechanical energy and may generate an ultrasonic wave under the control of a controller (e.g., the controller 110 of FIG. 1). One of ordinary skill in the art may obviously understand the principle of a piezoelectric vibration element, so any detailed description related thereto is omitted. The mesh plate according to another embodiment may touch an aerosol forming substrate and atomize (aerosolize) the aerosol forming substrate. A vibration generated by the piezoelectric transducer according to another embodiment may produce a pressure wave on the aerosol forming substrate, and the pressure wave may atomize the aerosol forming substrate by pushing the substrate into a space, a barrow area, or a hole between fine meshes of the mesh plate.

Figure 5:
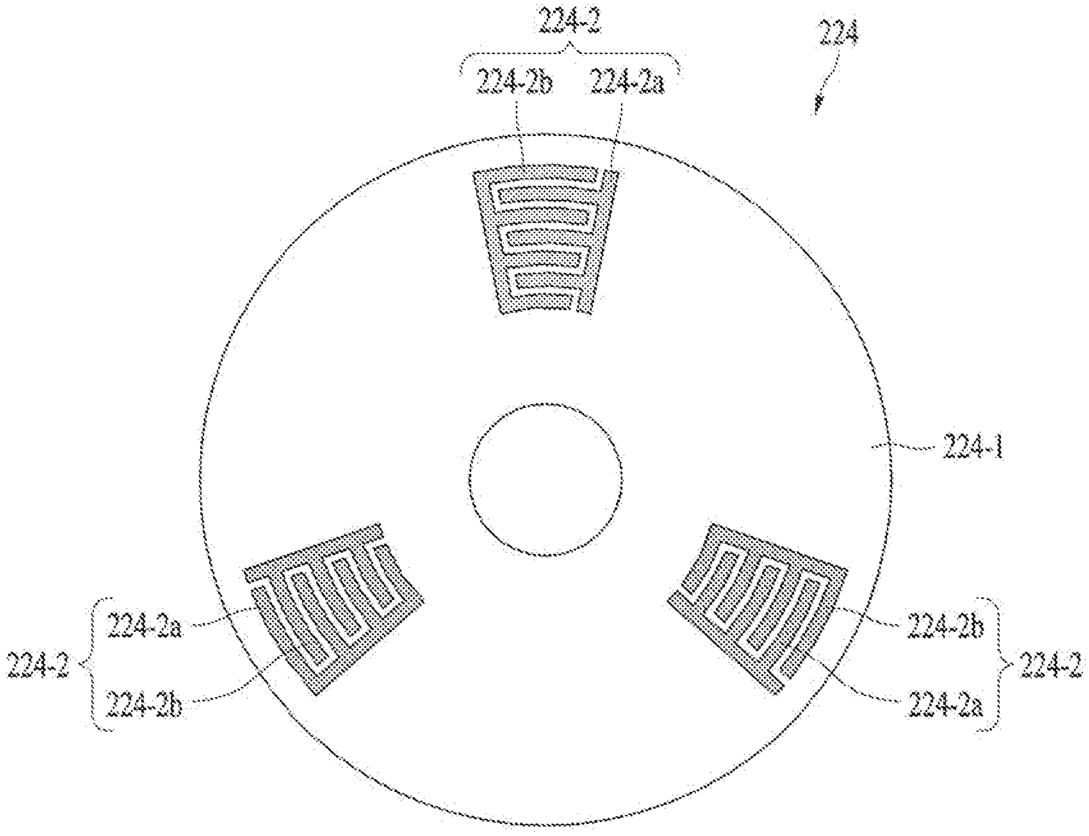
FIG. 5 is a plan view of a surface acoustic wave vibrator of an aerosol generating module according to an embodiment.

FIG. 5 is a plan view of the surface acoustic wave vibrator 224 of the aerosol generating module 220 according to an embodiment. The surface acoustic wave vibrator 224 may include the piezoelectric substrate 224-1 and the transducer 224-2. The transducer 224-2 according to an embodiment may include a first electrode **224-2*a* and a second electrode 224-2*b*. The first electrode 224-2*a* and the second electrode 224-2*b* according to an embodiment may each include two or more fingers. The piezoelectric substrate between the fingers may be deformed by being stretched and compressed due to a voltage applied to individual fingers of the electrodes 224-2*a* and 224-2*b* of the transducer 224-2, and accordingly the piezoelectric substrate 224-1 may be mechanically deformed or vibrated. A distance between the fingers of the electrodes 224-2*a* and 224-26 according to an embodiment may correspond to a wavelength of a mechanical wave. The mechanical wave generated in this way may generally have a nanometer-scale amplitude and may travel along a surface of the piezoelectric substrate 224-1. An aerosol may be generated by a surface acoustic wave generated by the surface acoustic wave vibrator 224** according to an embodiment.

In an embodiment, a commonly known SAW sensor chip may be used as the surface acoustic wave vibrator 224. The SAW sensor chip according to an embodiment may include at least one interdigital transducer including an electrode typically disposed on the piezoelectric substrate 224.1.

Figure 6:
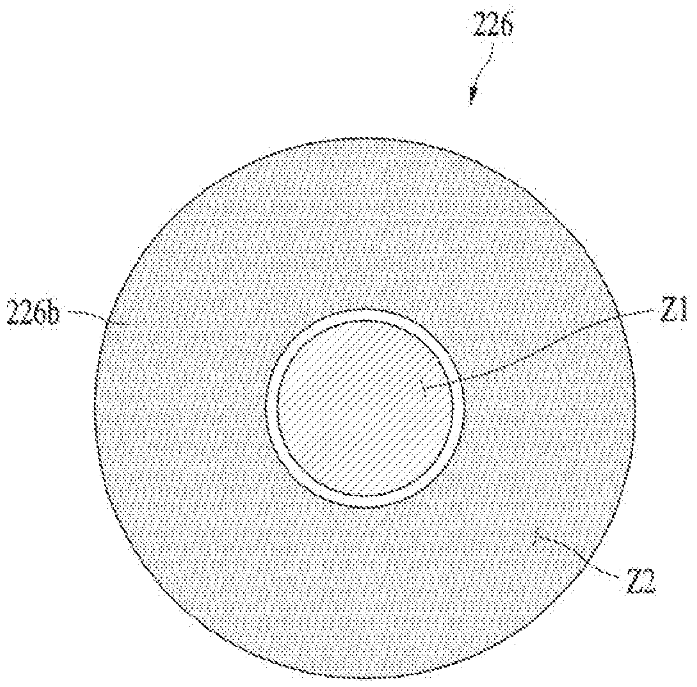
FIG. 6 is a rear view of a transfer element of an aerosol generating module according to an embodiment.

FIG. 6 is a rear view of the transfer element 226 of the aerosol generating module 220 according to an embodiment. As described above, the transfer element 226 may include the first surface **226*a* and the second surface 226*b*. A partial region of the first surface 226*a* of the transfer element 226 may be adjacent to the ultrasonic vibrator 222, and at least a portion of a remainder of the first surface 226*a* may be adjacent to the surface acoustic wave vibrator 224. Referring to FIG. 6, the first surface 226*a* of the transfer element 226 may include a first region Z1 and a second region Z2. In an embodiment, the first region 21 of the first surface 226*a* of the transfer element 226 may be a region overlapping the ultrasonic vibrator 222. The second region Z2 of the first surface 226*a* of the transfer element 226 may be a region overlapping the surface acoustic wave vibrator 224. The areas of the first region Z1 and the second region Z2 may vary according to embodiments, depending on sizes of the ultrasonic vibrator 222 and the surface acoustic wave vibrator 224, and are not limited to the areas and shapes illustrated in FIG. 6**.

The transfer element 226 according to an embodiment may be a capillary tube clement, for example, a through-element for allowing a paper strip, a wick, or a cartridge to pass through, but embodiments are not limited thereto.

Hereinafter, referring to FIGS. 7 and 8, the aerosol generating device 200 (e.g., the aerosol generating device 100 of FIG. 1) including the aerosol generating module 220 is described in detail.

Figure 7:
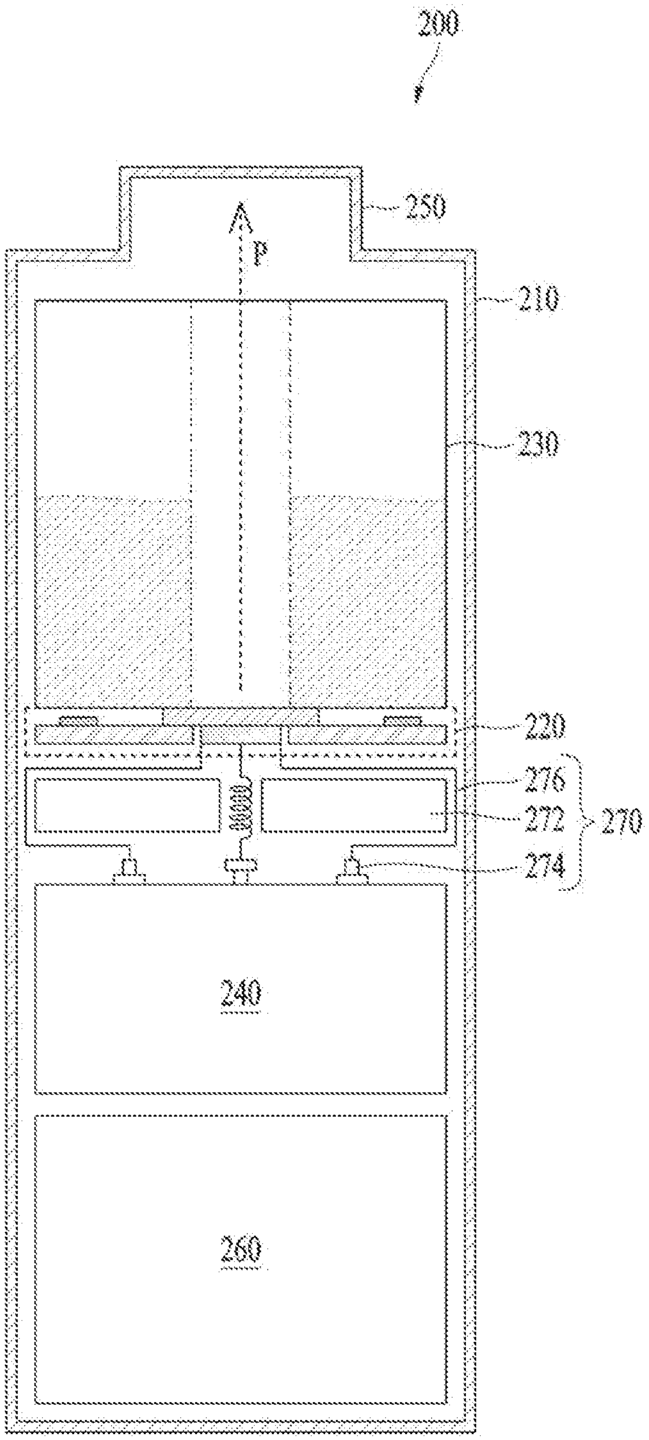
FIG. 7 is a cross-sectional view of an aerosol generating device according to an embodiment.

FIG. 7 is a cross-sectional view of an aerosol generating device according to an embodiment. Referring to FIG. 7, the aerosol generating device 200 may include a housing 210, the aerosol generating module 220, a cartridge 230, a controller 240, a mouthpiece 250, a battery 260, and auxiliary elements 270.

In an embodiment, the housing 210 may be configured to accommodate various electronic/mechanical components. In an embodiment, the aerosol generating module 220, the cartridge 230, the controller 240, the battery 260, and the auxiliary elements 270 may all be accommodated in the housing 210 and safely protected from an external stimulus (e.g., dust, impact, heat, etc.).

In an embodiment, the aerosol generating module 220 may include the ultrasonic vibrator 222, the surface acoustic wave vibrator 224, and the transfer element 226, Because the aerosol generating module 220 according to an embodiment is described in detail with reference to FIGS. 2*a* to 6, a detailed description of the aerosol generating module 220 is omitted below.

In an embodiment, the cartridge 230 may be disposed in the housing 210 and may store an aerosol forming substrate. The aerosol forming substrate may be stored in the cartridge 230 in at least one of a gaseous, liquid, or solid phase, and desirably, may be stored in the cartridge 230 in the liquid phase. The cartridge 230 according to an embodiment is described in more detail below with reference to FIG. 8.

In an embodiment, the controller 240 may include at least one processor. The processor may be implemented as an array of a plurality of logic gates, or may be implemented as a combination of a general-purpose microprocessor and a memory in which a program executable by the microprocessor is stored. The controller 240, included in the aerosol generating device 200 according to an embodiment, may control whether the ultrasonic vibrator 222 and the surface acoustic wave vibrator 224 of the aerosol generating module 220 vibrate and the vibration frequencies of the ultrasonic vibrator 222 and the surface acoustic wave vibrator 224. The controller 240 according to an embodiment is described in more detail below.

In an embodiment, the mouthpiece 250 is a portion that touches a mouth of a user, and an aerosol may be transferred to the user through a liquid flow path included in the mouthpiece 250. In an embodiment, the mouthpiece 250 may be disposed at an end of the housing 210, and desirably, the mouthpiece 250 may be disposed to touch an end surface of the housing 210.

In an embodiment, the battery 260 (e.g., the battery 140 of FIG. 1) may supply power used to operate the aerosol generating device 200. For example, the battery 260 may supply power such that the ultrasonic vibrator 222 and the surface acoustic wave vibrator 224 of the aerosol generating module 220 may vibrate, and the battery 260 may supply power required for the controller 240 to operate. In addition, the battery 260 may supply power required to operate a display, a sensor, a motor, or the like installed in the aerosol generating device 200.

In an embodiment, the auxiliary elements 270 may include an elastic body 272, an electrode pin 274, and a wire 276. The auxiliary elements 270 according to an embodiment may include all additional units for smoothly operating the aerosol generating device 200 in addition to the above-described module and/or units. The elastic body 272 according to an embodiment may be disposed adjacent to the aerosol generating module 220 and compressed such that the aerosol forming substrate is smoothly transferred to the aerosol generating module 220 from the cartridge 230. As a distance between the transfer element 226 and the cartridge 230 of the aerosol generating module 220 is shortened by the compression of the elastic body 272, the aerosol forming substrate, in at least one of the gaseous, liquid, or solid phase, stored in the cartridge 230 may be efficiently transferred to the aerosol generating module 220. The electrode pin 274 and the wire 276 according to an embodiment may connect the controller 240 and the battery 260 to the aerosol generating module 220 and transfer power to the aerosol generating module 220 and control the aerosol generating module 220.

The aerosol generating module 220 controlled by the controller 240 is described below. In an embodiment, the controller 240 may control the aerosol generating device 200 to operate in one of at least two modes.

A first mode according to an embodiment may correspond to a mode in which the ultrasonic vibrator 222 and the surface acoustic wave vibrator 224 simultaneously vibrate. In the first mode, even when the ultrasonic vibrator 222 and the surface acoustic wave vibrator 224 simultaneously vibrate, they vibrate at different vibration frequencies and with different vibration periods, such that they may be divided into a main-vibration member and a sub-vibration member. When the ultrasonic vibrator 222 is the main-vibration member, the surface acoustic wave vibrator 224 may be the sub-vibration member. When the surface acoustic wave vibrator 224 is the main-vibration member, the ultrasonic vibrator 222 may be the sub-vibration member. When an aerosol is generated by the main-vibration member, the sub-vibration member may further increase an amount of the generated aerosol.

A second mode according to an embodiment may be a mode in which one of the ultrasonic vibrator 222 or the surface acoustic wave vibrator 224 vibrates first to preheat the aerosol forming substrate of the transfer element 226, and the other of the ultrasonic vibrator 222 or the surface acoustic wave vibrator 224 vibrates to generate an aerosol. When the aerosol forming substrate is in the liquid phase, the aerosol forming substrate may generally have a high viscosity. It is desirable that a predetermined level of heat is applied to preheat the aerosol forming substrate to lower the viscosity such that the aerosol forming substrate is more smoothly aerosolized. Accordingly, allowing one of the ultrasonic vibrator 222 or the surface acoustic wave vibrator 224 to vibrate to preheat the aerosol forming substrate included in the transfer element 226 and then allowing the other to vibrate may generate a larger amount of aerosol. In particular, when the aerosol forming substrate is preheated by self-heating of the ultrasonic vibrator 222 and a preheat temperature is greater than or equal to a predetermined temperature (e.g., the Curie temperature), a unit included in the ultrasonic vibrator 222 may be damaged, resulting in damage to a device. In this regard, the device may have better durability when the preheating is performed by the surface acoustic wave vibrator 224 and then an aerosol is generated by the ultrasonic vibrator 222.

The controller 240 according to an embodiment may enable the aerosol generating device 200 to operate in various modes in addition to the above-described first and second modes.

Figure 8:
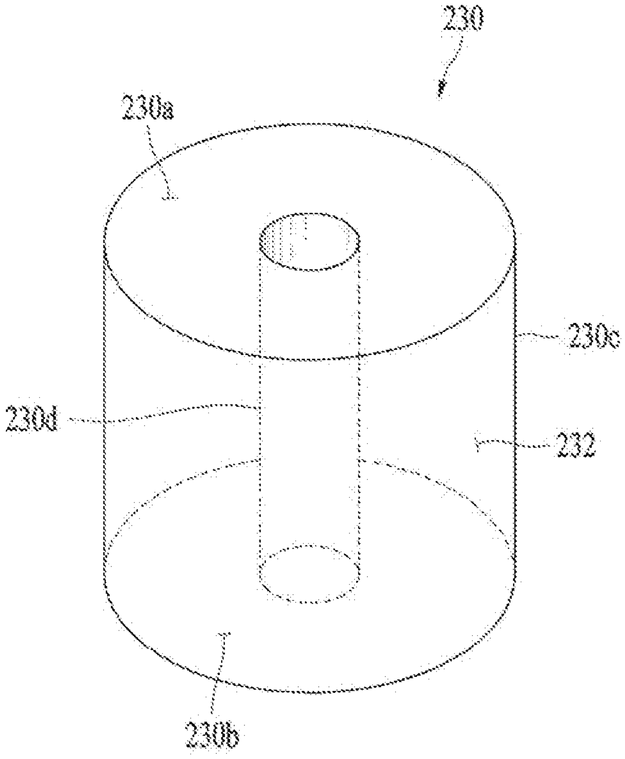
FIG. 8 is a schematic diagram of a cartridge according to an embodiment.

FIG. 8 is a schematic diagram of the cartridge 230 according to an embodiment. In an embodiment, the cartridge 230 may include a first end wall 230*a*, a second end wall 230*b* disposed on an opposite side of the first end wall 230*a*, and an outer circumferential wall 230*c* and an inner circumferential wall 230*d* connecting the first end wall 230*a* and the second end wall 230*b*. The first end wall 230*a*, the second end wall 230*b*, the outer circumferential wall 230*c*, and the inner circumferential wall 230*d* may form a storage space 232 for storing an aerosol forming substrate. When formed as described above, the cartridge 230 according to an embodiment may form a through-hole that passes through the first end wall 230*a* and the second end wall 230*b*. When the cartridge 230 according to an embodiment is disposed in the aerosol generating device 200, an aerosol formed from an upper portion (e.g., the second surface 226*b* of the transfer element 226 of FIG. 3) of the transfer element 226 may travel through the through-hole (refer to FIG. 7). That is, the cartridge 230 according to an embodiment may include an airflow path (e.g., an airflow path P of FIG. 7) passing through the first end wall 230*a* and the second end wall 230*b* and surrounded by the inner circumferential wall

230*d*, and the aerosol may be transferred to the mouthpiece 250 through the airflow path P and reach a mouth of a user.

Although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner or replaced or supplemented by other components or their equivalents.

Therefore, other implementations, other embodiments, and equivalents of the claims are within the scope of the following claims.

The invention claimed is:

1. An aerosol generating module comprising:

an ultrasonic vibrator configured to generate an ultrasonic wave;

a surface acoustic wave vibrator configured to generate a surface acoustic wave; and a transfer element configured to transfer an aerosol forming substrate to at least one of the ultrasonic vibrator or the surface acoustic wave vibrator, wherein the surface acoustic wave vibrator is disposed to surround the ultrasonic vibrator.

2. The aerosol generating module of claim 1, wherein the transfer element comprises a first surface facing at least one of the ultrasonic vibrator and the surface acoustic wave vibrator, and a second surface disposed on an opposite side of the first surface, and a portion of the first surface is adjacent to the ultrasonic vibrator, and at least a portion of a remainder of the first surface is adjacent to the surface acoustic wave vibrator.

3. The aerosol generating module of claim 1, wherein a temperature of the aerosol generating module increases due to vibrations of the ultrasonic vibrator and the surface acoustic wave vibrator.

4. The aerosol generating module of claim 1, wherein the ultrasonic vibrator comprises a piezoelectric body, and the surface acoustic wave vibrator comprises a piezoelectric substrate and a transducer.

5. An aerosol generating device comprising:

a housing;

a cartridge disposed inside the housing and configured to store an aerosol forming substrate; and an aerosol generating module disposed adjacent to the cartridge, and comprising:

an ultrasonic vibrator configured to generate an ultrasonic wave;

a surface acoustic wave vibrator configured to generate a surface acoustic wave; and a transfer element comprising the aerosol forming substrate, wherein the ultrasonic vibrator and the surface acoustic wave vibrator are each disposed adjacent to at least one surface of the transfer element.

6. The aerosol generating device of claim 5, wherein the transfer element comprises a first surface facing at least one of the ultrasonic vibrator and the surface acoustic wave vibrator, and a second surface disposed an opposite side of the first surface and facing the cartridge, and a portion of the first surface is adjacent to the ultrasonic vibrator, and at least a portion of a remainder of the first surface is adjacent to the surface acoustic wave vibrator.

7. The aerosol generating device of claim 6, wherein the surface acoustic wave vibrator is disposed to surround the ultrasonic vibrator, and a first region of the first surface of the transfer element overlaps the ultrasonic vibrator, and a second region of the first surface of the transfer element overlaps the surface acoustic wave vibrator.

8. The aerosol generating device of claim 5, wherein the ultrasonic vibrator comprises a piezoelectric body, and the surface acoustic wave vibrator comprises a piezoelectric substrate and a transducer.

9. The aerosol generating device of claim 5, wherein the cartridge comprises a first end wall, a second end wall disposed on an opposite side of the first end wall, and an outer circumferential wall and an inner circumferential wall configured to connect the first end wall and the second end wall, and the first end wall, the second end wall, the outer circumferential wall, and the inner circumferential wall form a storage space configured to store the aerosol forming substrate.

10. The aerosol generating device of claim 9, comprising:

an airflow path passing through the first end wall and the second end wall and surrounded by the inner circumferential wall, wherein an aerosol moves through the airflow path.

11. The aerosol generating device of claim 5, further comprising:

a controller configured to control the ultrasonic vibrator and the surface acoustic wave vibrator to vibrate and control vibration frequencies of the ultrasonic vibrator and the surface acoustic wave vibrator.

12. The aerosol generating device of claim 11, wherein the controller is configured to control the aerosol generating device to operate in one of at least two modes, and the at least two modes comprise:

a first mode in which the ultrasonic vibrator and the surface acoustic wave vibrator simultaneously vibrate at different vibration frequencies and with different vibration periods to generate an aerosol; and a second mode in which one of the ultrasonic vibrator or the surface acoustic wave vibrator vibrates first to preheat the aerosol forming substrate of the transfer element and then the other of the ultrasonic vibrator or the surface acoustic wave vibrator vibrates to generate the aerosol.

* * * * *